(12) United States Patent
Dubuque

(10) Patent No.: US 12,030,690 B2
(45) Date of Patent: Jul. 9, 2024

(54) MULTI-LAYER BARRIER FOR A CONTAINER

(71) Applicant: AMCOR RIGID PACKAGING USA, LLC, Ann Arbor, MI (US)

(72) Inventor: William J. Dubuque, Dexter, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 0 days.

(21) Appl. No.: 17/848,483

(22) Filed: Jun. 24, 2022

(65) Prior Publication Data

US 2022/0315270 A1   Oct. 6, 2022

Related U.S. Application Data

(63) Continuation of application No. 16/467,082, filed as application No. PCT/US2016/065565 on Dec. 8, 2016, now Pat. No. 11,390,416.

(51) Int. Cl.
| | | |
|---|---|---|
| *B65D 1/40* | (2006.01) | |
| *B65D 1/02* | (2006.01) | |
| *B29K 67/00* | (2006.01) | |

(52) U.S. Cl.
CPC ............. *B65D 1/40* (2013.01); *B65D 1/0215* (2013.01); *B29C 2949/3012* (2022.05);
(Continued)

(58) Field of Classification Search
CPC ............. B29B 11/14; B29C 2045/1648; B29C 2049/222; B29C 2949/071;
(Continued)

(56) References Cited

U.S. PATENT DOCUMENTS

| | | |
|---|---|---|
| 5,759,653 A | 6/1998 | Collette et al. |
| 6,123,211 A | 9/2000 | Rashid et al. |
| (Continued) | | |

FOREIGN PATENT DOCUMENTS

| | | |
|---|---|---|
| EP | 1913085 B1 | 10/2008 |
| EP | 2231373 B1 | 7/2015 |
| (Continued) | | |

OTHER PUBLICATIONS

U.S. Appl. No. 16/467,082, filed Jun. 6, 2019, William J. Dubuque.
(Continued)

*Primary Examiner* — Yan Lan
(74) *Attorney, Agent, or Firm* — Harness, Dickey & Pierce, P.L.C.

(57) ABSTRACT

A method for manufacturing a container including: forming a preform by injection molding, the preform having a bottom portion, a body portion, and a finish portion including a top sealing surface, threads, and a support flange; forming the preform such that the top sealing surface is made of a base layer, and such that the body portion and the bottom portion are both made of the base layer and an oxygen barrier layer; and forming the container from the preform by blow molding. The top sealing surface includes only the base layer. The body portion and the bottom portion both include an inner portion made of the base layer, an outer portion made of the base layer, and an oxygen barrier layer between the inner portion and the outer portion.

15 Claims, 6 Drawing Sheets

(52) U.S. Cl.
CPC .............. B29C 2949/3016 (2022.05); B29C 2949/302 (2022.05); B29C 2949/3036 (2022.05); B29K 2067/003 (2013.01); B29K 2995/0067 (2013.01)

(58) Field of Classification Search
CPC .... B29C 2949/0715; B29C 2949/3012; B29C 2949/3016; B29C 2949/302; B29C 2949/3032; B29C 2949/3036; B29C 45/16; B29C 49/071; B29K 2067/003; B29K 2995/0067; B65D 1/0215; B65D 1/40

See application file for complete search history.

(56) References Cited

U.S. PATENT DOCUMENTS

| | | |
|---|---|---|
| 6,344,249 B1 | 2/2002 | Maruyama et al. |
| 6,465,062 B2 | 10/2002 | Cook et al. |
| 7,655,746 B2 | 2/2010 | Jernigan |
| 8,524,340 B2 | 9/2013 | Hashimoto et al. |
| 8,647,728 B2 | 2/2014 | Drbohlav, III et al. |
| 2002/0098310 A1 | 7/2002 | Kikuchi et al. |
| 2003/0186006 A1 | 10/2003 | Schmidt et al. |
| 2004/0065984 A1 | 4/2004 | Ota et al. |
| 2004/0074904 A1 | 4/2004 | Share et al. |
| 2004/0146675 A1 | 7/2004 | Hashimoto et al. |
| 2005/0181156 A1 | 8/2005 | Schmidt et al. |
| 2008/0113060 A1 | 5/2008 | Richards et al. |
| 2011/0008554 A1 | 1/2011 | Chen et al. |
| 2014/0220281 A1 | 8/2014 | Black et al. |
| 2014/0251857 A1 | 9/2014 | Schmitz et al. |
| 2016/0222205 A1 | 8/2016 | Akkapeddi et al. |

FOREIGN PATENT DOCUMENTS

| | | |
|---|---|---|
| EP | 1651527 B1 | 3/2016 |
| JP | 2006334849 A | 12/2006 |
| WO | 0068000 A1 | 11/2000 |

OTHER PUBLICATIONS

International Search Report and Written Opinion issued in PCT/US2016/065565, mailed Jul. 27, 2017; ISA/KR.

Supplementary Partial European Search Report issued in corresponding European Patent Application No. 16923421 dated Jun. 30, 2020.

Extended European Search Report dated Sep. 22, 2020 issued in corresponding European Patent Application No. 16923421.8 (19 pages).

Colombian Office Action issued in corresponding Colombian Patent Application No. NC2019/0006960 dated Sep. 16, 2021 (9 pages).

Anonymous: "Intrinsic Viscosity of Plastic PET—R.P.E.T. (Recycled polyethylene terephthalate)", , Sep. 11, 2020 (Sep. 11, 2020), XP055730098, Retrieved from the Internet: URL:https://site.google.com/site/petbottleflake/home/intrinsic-viscosity-ofplastic- pet.

European Office Action regarding Application No. 169234218, dated Feb. 24, 2022.

Canadian Office Action regarding Application No. 3,044,807, mailed Apr. 5, 2022.

*Haze Advantage for highly diluted O2 scavenger in B-layer*

*22.5g bottle*

| B-Layer wt. % | Barrier Layer Wt% | Bottle Haze % |
|---|---|---|
| Virgin PET (no barrier additive) | 0% | 2% |
| Monolayer PET + 1.1% Barrier | 0.00% | 2.10% |
| ML PET with 0.6% Barrier blended in 25% B-layer | 25.00% | 2.20% |
| ML PET with 0.6% Barrier blended in 30% B-layer | 30.00% | 2.03% |
| ML PET with 0.6% Barrier blended in 40% B-layer | 40.00% | 1.63% |
| ML PET with 0.6% Barrier blended in 50% B-layer | 50.00% | 1.83% |

MULTI-LAYER BARRIER FOR A CONTAINER

CROSS-REFERENCE TO RELATED PATENT APPLICATIONS

This application is a continuation of U.S. patent application Ser. No. 16/467,082 filed on Jun. 6, 2019, which is a U.S. National Phase Application under 35 U.S.C. 371 of International Application No. PCT/US2016/065565 filed on Dec. 8, 2016. The entire disclosures of the above-referenced patent applications are incorporated herein by reference.

FIELD

The present disclosure relates to a multi-layer barrier preform for a container.

BACKGROUND

This section provides background information related to the present disclosure, which is not necessarily prior art.

While current containers are suitable for their intended use, they are subject to improvement. For example, a low-cost, polymeric container having an oxygen barrier layer that is effective and clear would be desirable. The present teachings advantageously provide for a container preform that can be injection blow-molded to produce such a container. The present teachings provide numerous other advantages and unexpected results, as one skilled in the art will recognize.

SUMMARY

This section provides a general summary of the disclosure, and is not a comprehensive disclosure of its full scope or all of its features.

The present disclosure includes a method for manufacturing a container including: forming a preform by injection molding, the preform having a bottom portion, a body portion, and a finish portion including a top sealing surface, threads, and a support flange; forming the preform such that the top sealing surface is made of a base layer, and such that the body portion and the bottom portion are both made of the base layer and an oxygen barrier layer; and forming the container from the preform by blow molding. The top sealing surface includes only the base layer. The body portion and the bottom portion both include an inner portion made of the base layer, an outer portion made of the base layer, and an oxygen barrier layer between the inner portion and the outer portion.

The present disclosure further provides for a container including a finish portion with a top sealing surface, threads, and a support flange. The container also has a body portion and a bottom portion. The top sealing surface includes only a base layer. The body portion and bottom portion each include an inner portion made of the base layer, an outer portion made of the base layer, and an oxygen barrier layer between the inner portion and the outer portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 6:
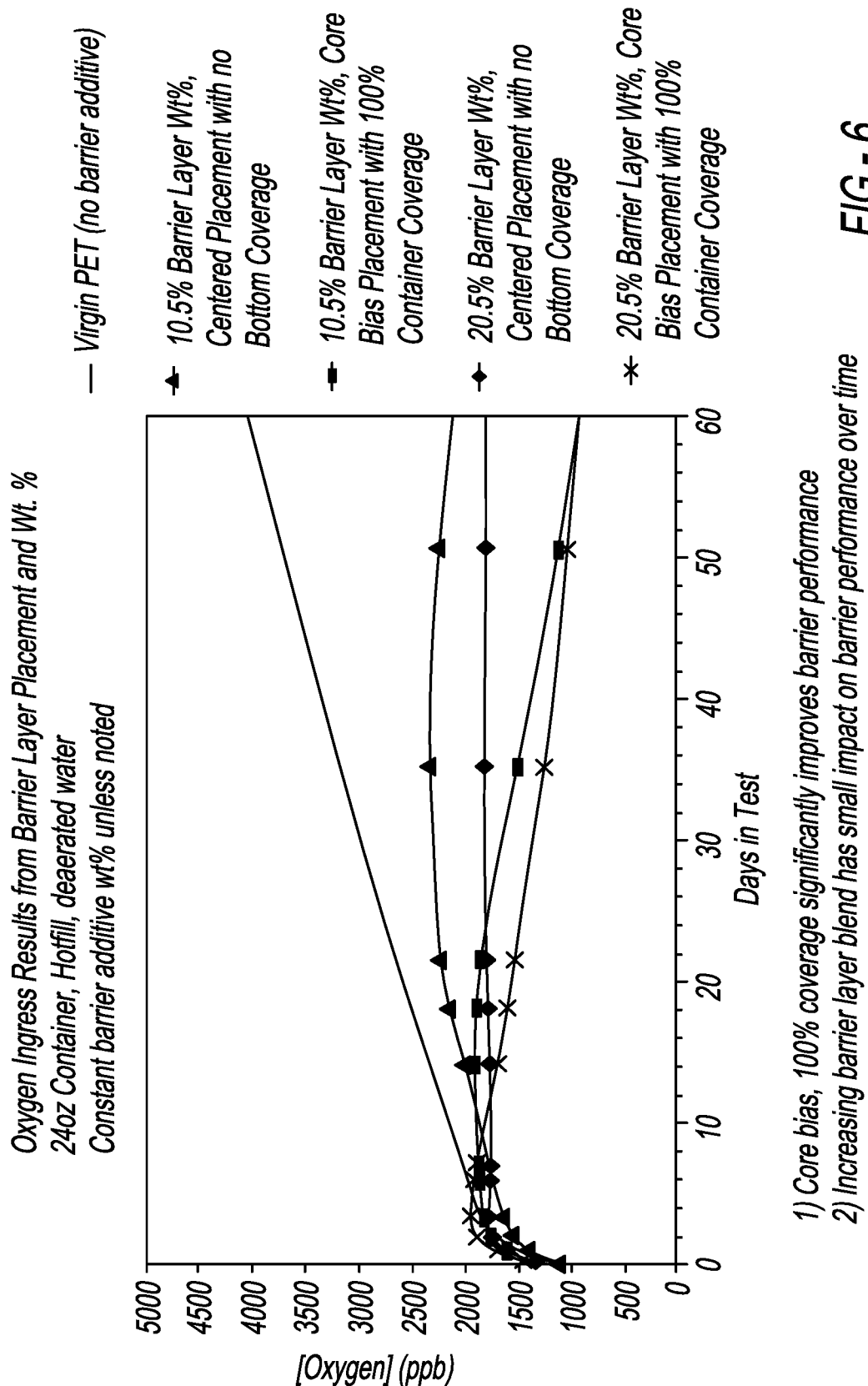
Figure 7:
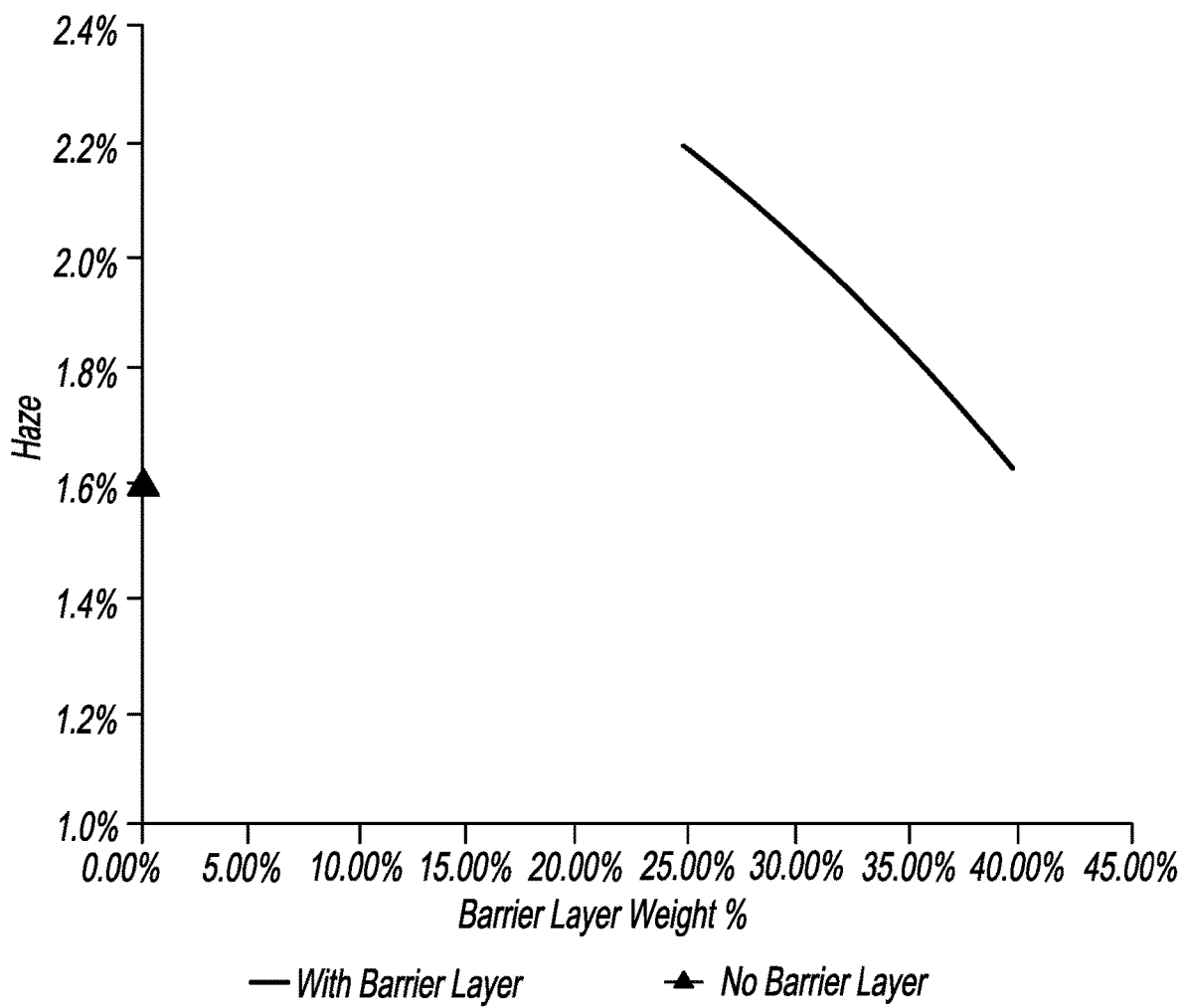

FIG. 6 shows exemplary improved oxygen barrier results that occur when the oxygen barrier layer 52 is confined to the inner area 50A; and FIG. 7 illustrates container haze percentage versus barrier layer weight for a preform according to the present teachings having 0.6% oxygen scavenger in the barrier layer 52.

Corresponding reference numerals indicate corresponding parts throughout the several views of the drawings.

DETAILED DESCRIPTION

Example embodiments will now be described more fully with reference to the accompanying drawings.

Figure 1:
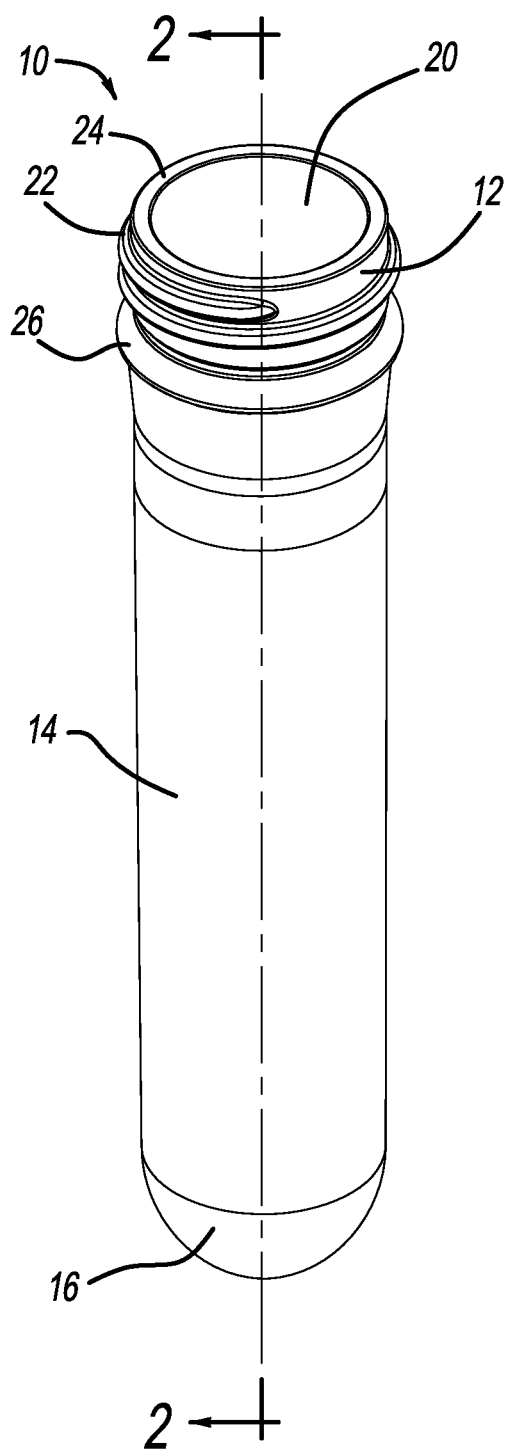
FIG. 1 is a perspective view of a container preform in accordance with the present teachings.

FIG. 1 illustrates a preform according to the present teachings at reference numeral 10. The preform 10 is configured to form a container in any suitable manner, such as by injection blow molding. The container formed from the preform 10 can be any suitable container, having any suitable shape and size. For example, the container formed from the preform 10 can be for storing oxygen sensitive products including ketchup, pasta sauce, salsa, applesauce, beer, wine, etc. The preform 10 can be formed in any suitable manner, such as by any suitable multi-layer injection molding process. The preform 10 according to the present teachings is configured to be blow-molded into a container that absorbs no more than 22 ppm of oxygen over a 24-month shelf life. The preform 10 can include any suitable polymeric material, and any suitable oxygen barrier layer, as described further herein.

The preform 10 generally includes a finish portion 12, a body portion 14, and a bottom portion 16. A longitudinal axis A of the preform 10 extends through a radial center of the preform 10 along a length of the preform 10. The body portion 14 is arranged along the longitudinal axis A between the finish portion 12 and the bottom portion 16.

The finish portion 12 defines an opening 20. The longitudinal axis A extends through a radial center of the opening 20. The opening 20 provides access to an interior of the preform 10, and to an inner volume defined by a container formed from the preform 10. Extending from an outer surface of the finish portion 12 are threads 22. The threads 22 are configured to cooperate with threads of any suitable closure. Cooperation between threads of the closure and the threads of the finish portion 12 secures the closure to a top sealing surface 24 of the finish portion 12 in order to seal the container closed. The threads 22 are between the top sealing surface 24 and a support flange 26, which extends outward and is configured to support the preform 10 in any suitable blow molding equipment as the preform 10 is blow molded into a container.

The body portion 14 of the preform 10 is configured to be blow molded into a body portion of the container, and the bottom portion 16 is configured to be blow molded into a base portion of the container. The body portion 14 can be configured in any suitable manner to provide the resulting container with any suitable body portion having any suitable size, shape, and surface features, such as any suitable panels and ribs configured to absorb vacuum or pressure forces. The bottom portion 16 can be configured to provide the resulting container with any suitable base portion having any suitable size, shape, and surface features, such as surface features configured to absorb vacuum forces and/or to facilitate movement of the base to absorb vacuum forces. The base portion of the container can be any suitable base portion known in the art, such as any suitable flexible base portion configured to absorb vacuum forces that may be present in the container, such as during a hot fill-process.

Figure 2:
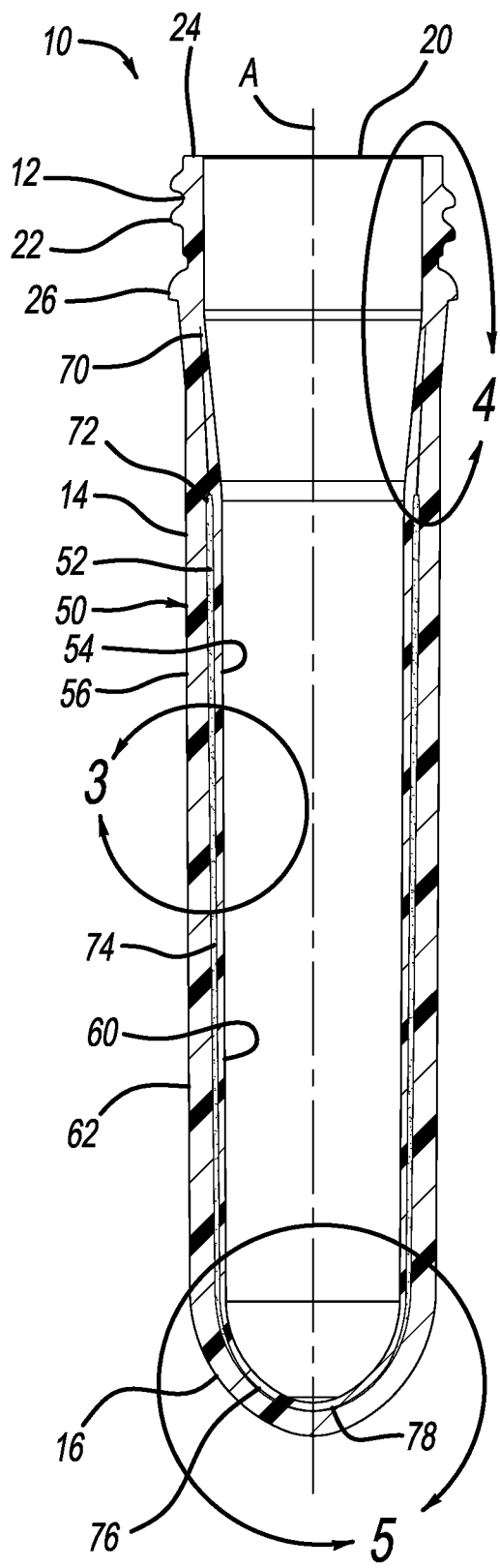
FIG. 2 is a cross-sectional view taken along line 2-2 of FIG. 1.

FIG. 2 is a cross-sectional view of the preform 10. Each one of the finish portion 12, the body portion 14, and the bottom portion 16 is formed by a base layer 50. An oxygen barrier layer 52 is arranged within the base layer 50. Specifically, the oxygen barrier layer 52 is arranged between an inner portion 54 and an outer portion 56 of the base layer 50. The oxygen barrier layer 52 extends from anywhere along the preform body portion 14 or finish portion 12, such as from about the support flange 26, across the body portion 14, and both to and across the bottom portion 16. As explained further herein, the oxygen barrier layer 52 generally tapers inward toward the longitudinal axis A as the oxygen barrier layer 52 extends away from the support flange 26 and towards the bottom portion 16.

Figure 3A:
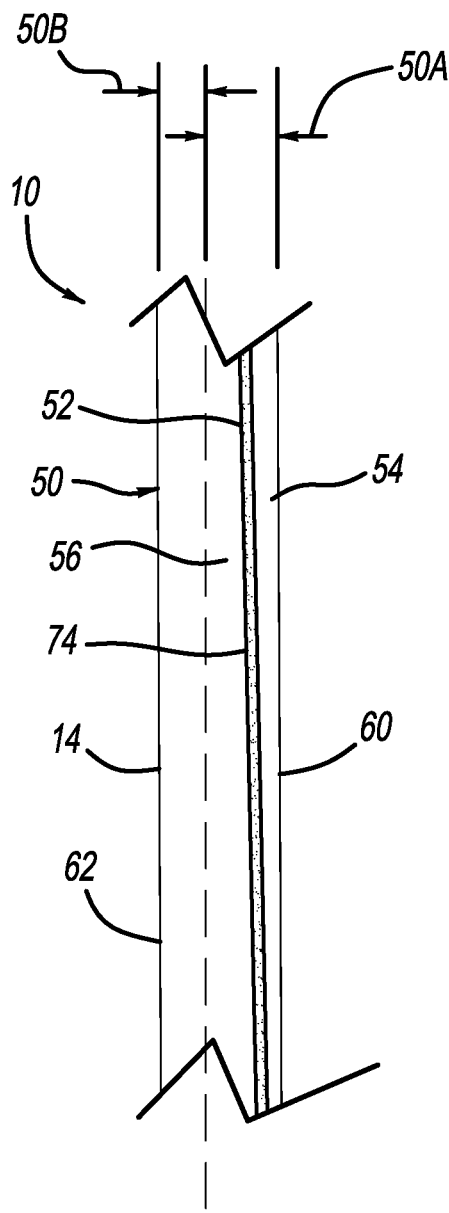
FIG. 3A illustrates area 3 of FIG. 2 in accordance with an embodiment of the present teachings.
Figure 3B:
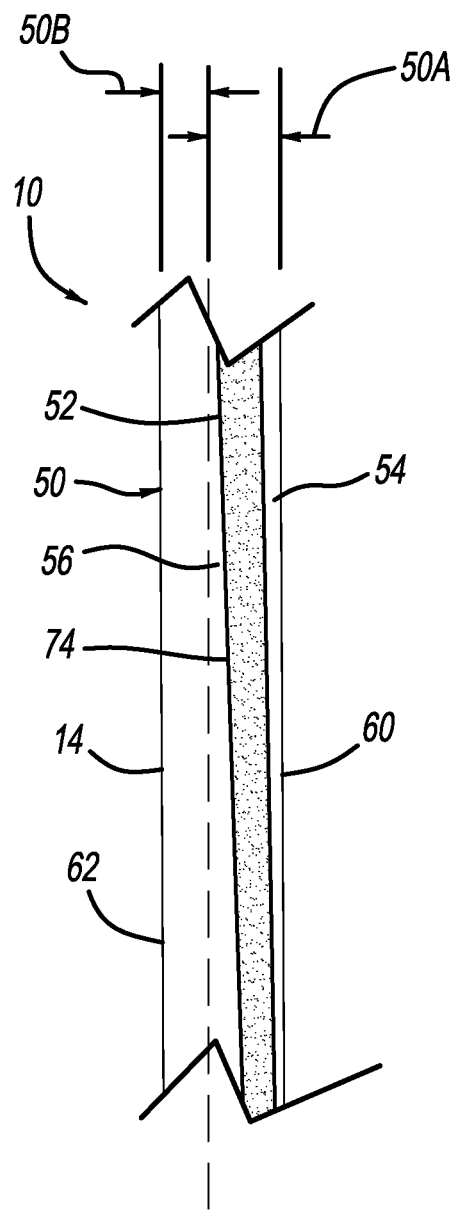
FIG. 3B illustrates area 3 of FIG. 2 in accordance with another embodiment of the present teachings.

FIGS. 3A and 3B are close-up views of area 3 of FIG. 2. FIG. 3A illustrates the oxygen barrier 52 having a first thickness (width in cross-section), and FIG. 3B illustrates the oxygen barrier 52 having a second thickness (width in cross-section) that is greater than the first thickness (width in cross-section). As illustrated in FIGS. 3A and 3B, the oxygen barrier layer 52 is confined to an inner area 50A of the base layer 50, and does not extend into an outer area 50B of the base layer 50. The inner area 50A is an inner 60% of the base layer 50, as measured from an inner surface 60 of the base layer 50, and includes the inner portion 54. The inner area 50A may include part of the outer portion 56 as well. The outer area 50B is an outer 40% of the base layer 50, as measured from an outer surface 62 of the base layer 50. The oxygen barrier layer 52 is confined to the inner area 50A (core biased) along an entire length of the body portion 14, as well as across the bottom portion 16. FIG. 6 is an example of improved oxygen barrier results when the oxygen barrier layer 52 is confined to the inner area 50A. The oxygen barrier layer 52 is tapered such that the oxygen barrier layer 52 is closest to the inner surface 60 at and proximate to the bottom portion 16, and is furthest from the inner surface 60 (and closest to the outer surface 62) furthest from the bottom portion 16 and proximate to the support flange 26.

Figure 4:
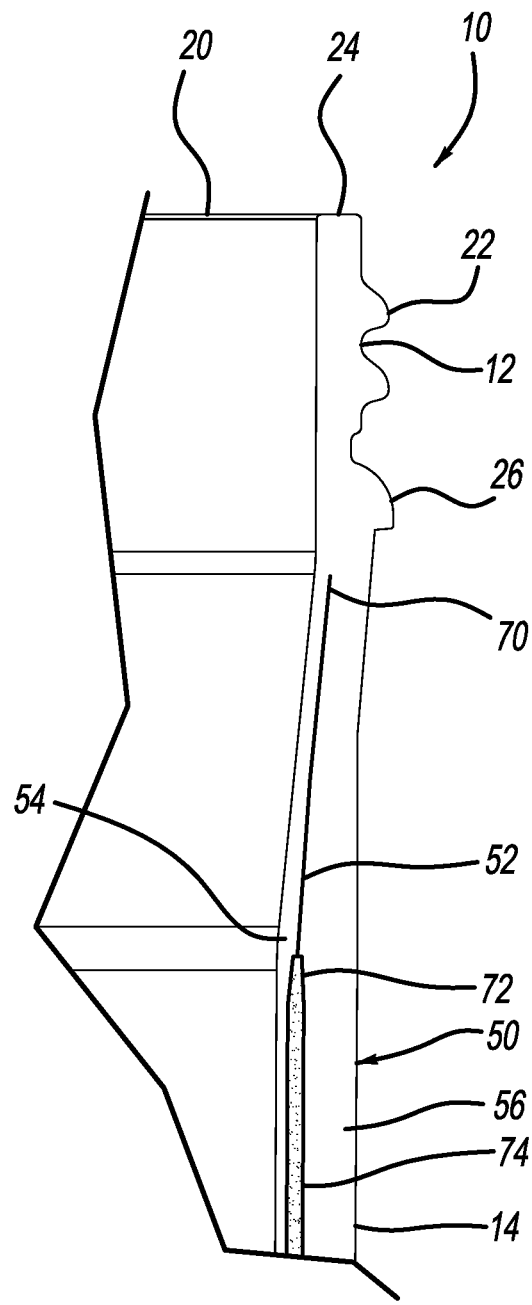
FIG. 4 illustrates area 4 of FIG. 2.

With additional reference to FIG. 4, which is a close-up view of area 4 of FIG. 2, the oxygen barrier layer 52 varies in thickness along a length thereof. Specifically, the oxygen barrier layer 52 is most thin at proximal end 70, which is at or most proximate to the finish portion 12. From the proximal end 70 the oxygen barrier layer 52 extends at a generally constant thickness away from the finish portion 12 to a tapered portion 72. At the tapered portion 72 the oxygen barrier layer 52 generally tapers outward in cross-section so as to gradually have a greater thickness. From the tapered portion 72 the oxygen barrier layer 52 assumes a generally uniform thickness along a barrier body portion 74, which extends along the length of the body portion 14. The uppermost or start of the tapered portion 72 can be any suitable distance from the top sealing surface (TSS) 24, such as 27 mm from the top sealing surface 24 for example. The lowermost or end of the tapered portion 72 (where the tapered portion 72 transitions to the barrier body portion 74) can be any suitable distance from the TSS 24, such as 33 mm from the TSS for example.

Figure 5:
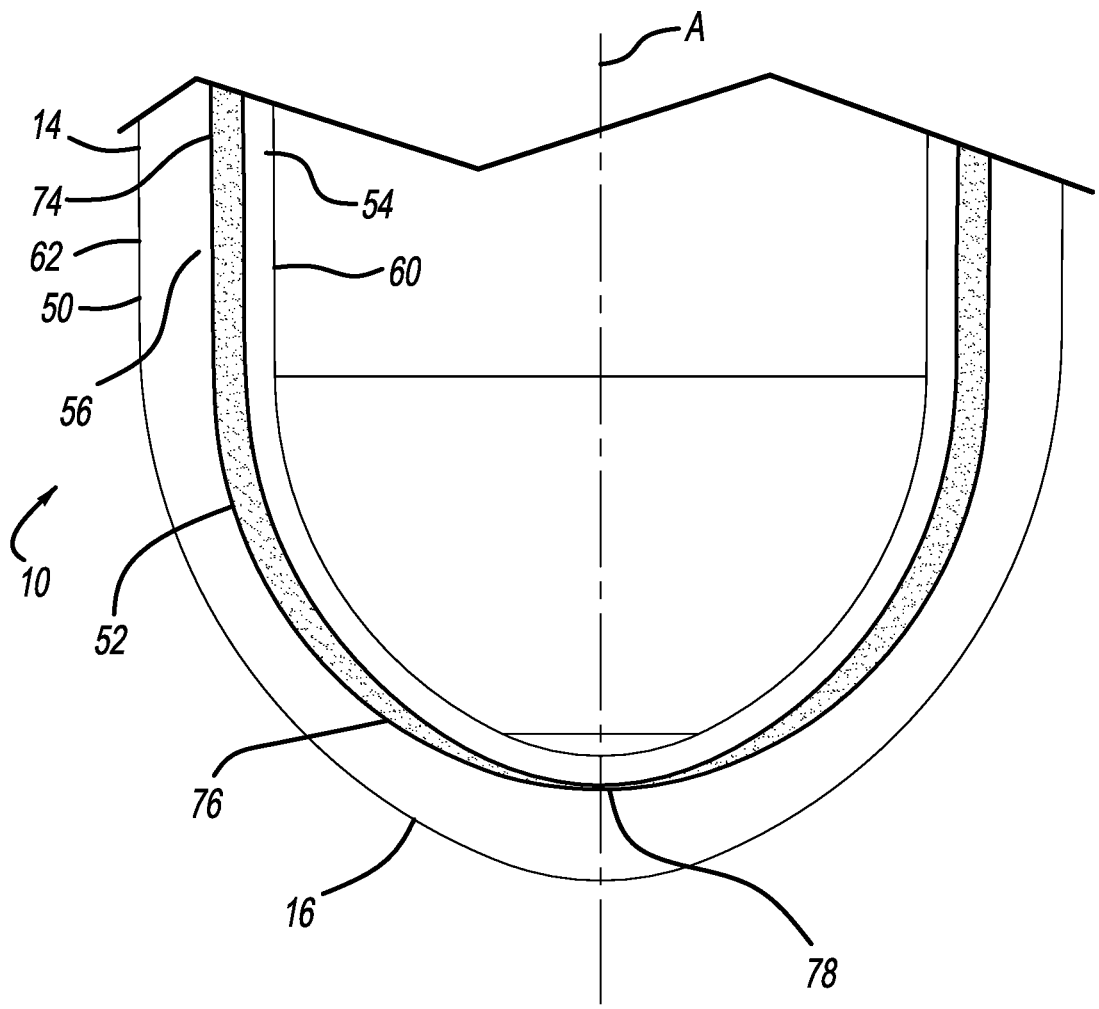
FIG. 5 illustrates area 5 of FIG. 2.

With reference to FIG. 5, which is a close-up view of area 5 of FIG. 2, the oxygen barrier layer 52 transitions to a barrier bottom portion 76 that fully encapsulates the bottom portion 16. The barrier bottom portion 76 of the oxygen barrier layer 52 gradually decreases in thickness from the barrier body portion 74 to a distal end 78 of the oxygen barrier layer 52. The distal end 78 is at a distalmost portion of the oxygen barrier layer 52 relative to the finish portion 12, and is positioned such that the longitudinal axis A extends through a center of the distal end 78.

The base layer 50 can be made of any suitable blow-molding grade polyethylene terephthalate (PET), such as a TPA-based polyethylene terephthalate copolymer resin designed for a wide range of bottle applications that is a high molecular weight polymer with about a 0.80 intrinsic viscosity (IV). For example, the blow-molding grade PET can include CLEARTUF® 8006 from M&G Chemicals of Luxembourg. The oxygen barrier layer 52 can include PET and any suitable oxygen scavenger. The PET of the oxygen barrier layer 52 can include a cobalt catalyst. The PET of the oxygen barrier layer 52 may also include at least one of a low to moderate copolymer, antimony free and titanium catalyzed polymer designed for processes requiring faster crystallization rates, higher glass transition and melting points. The PET of the oxygen barrier layer 52 may also include a PET copolymer that is substantially free from cobalt, compatible with oxygen scavenger additives, and has an intrinsic viscosity of about 0.76 to about 0.82. The oxygen scavenger of the oxygen barrier layer 52 may be any suitable oxygen scavenger, such as a composition including a polyester, a copolyester ether, and an oxidation catalyst. The copolyester ether includes a zinc compound and at least one polyether segment selected from the group of (and the group may consist of) poly(tetramethylene ether) and poly(tetramethylene-co-alkylene ether). The copolyester ether can further include a polyether segment of a poly(alkylene oxide) glycol selected from the group of (and the group may consist of) poly(ethylene oxide) glycol, poly(trimethylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol and poly(alkylene oxide) glycols derived from cyclic ether monomers. At least one of the base layer 50 and the oxygen barrier layer 52 can include any suitable regrind material, such as in-house or post-consumer regrind material.

The oxygen barrier layer 52 can further include at least one additive configured to make the oxygen barrier layer 52 clear or at least partially clear when measured for haze using a Hunter Lab spectrophotometer. Suitable additives include, for example, liquid or solid colorants and clarifier agents. Clarity may also be improved by using the methods described in the preceding paragraphs. The preform 10 is configured to be blow-molded into any suitable container having a container body haze of less than 5%.

The oxygen barrier layer 52 can have any suitable weight. For example, the oxygen barrier layer 52 can be configured to have a weight that is 8% to 50% of a total weight of the preform 10. When the preform 10 is configured to form a container for food products, the oxygen barrier layer 52 can be about 8%-35% of a total weight of the preform 10. When the preform 10 is configured to form a container for wine or beer products, the oxygen barrier layer 52 can be about 20%-50% of the total weight of the preform 10.

The oxygen barrier layer 52 can include an oxygen scavenger that is about 0.25%-5% of a total weight of the oxygen barrier layer 52. The oxygen barrier layer 52 can have any suitable thickness. For example, at the barrier body portion 74, the oxygen barrier layer 52 can have a thickness of 20%-40%, such as 30%, of a total thickness of the preform 10 at the body portion 14. One example using 0.6% oxygen scavenger in the barrier layer 52 is shown in FIG. 7. Measured haze of the bottle can be reduced as the barrier layer 52 weight percentage increases, resulting in improved bottle clarity as compared to a container with no barrier layer 52.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for manufacturing a container, the method comprising:
    forming a preform by injection molding, the preform having a bottom portion, a body portion, and a finish portion including a top sealing surface, threads, and a support flange;
    forming the preform such that the top sealing surface is made of a base layer, and such that the body portion and the bottom portion are both made of the base layer and an oxygen barrier layer encapsulated within the base layer and extending across the bottom portion; and
    forming the container from the preform by blow molding;
    wherein the top sealing surface includes only the base layer; and
    wherein the body portion and the bottom portion both include an inner portion made of the base layer, an outer portion made of the base layer, and the oxygen barrier layer between the inner portion and the outer portion, the inner portion of the base layer includes an inner surface defining a receptacle of the preform, and the outer portion of the base layer defines an outer surface of the preform;
    wherein:
        the oxygen barrier layer includes a polyethylene copolymer having an intrinsic viscosity of 0.76 dL/g-0.82 dL/g;
        the oxygen barrier layer includes an additive configured to make the oxygen barrier layer at least partially clear, the additive including at least one of a colorant and a clarifier agent;
        the oxygen barrier layer is 8%-50% of a total weight of the preform;

the oxygen barrier layer includes an oxygen scavenger that is 0.25%-5.0% of a total weight of the oxygen barrier layer; and the oxygen barrier layer is tapered such that the oxygen barrier layer is closest to the inner surface at and proximate to the bottom portion, and is farthest from the inner surface and closest to the outer surface farthest from the bottom portion and proximate to the support flange; and the oxygen barrier layer is confined to an inner half of a total preform wall thickness at the body portion of the preform.

2. The method of claim 1, wherein the oxygen barrier layer is confined to below each of the top sealing surface, the threads, and the support flange.

3. The method of claim 1, wherein the finish portion includes only the base layer.

4. The method of claim 1, wherein at the support flange and above, the finish portion includes only the base layer.

5. The method of claim 1, wherein the body portion and bottom portion of the preform forms a body and a base of the container; and wherein the body and the base of the container both include the inner portion made of the base layer, the outer portion made of the base layer, and the oxygen barrier layer between the inner portion and the outer portion.

6. The method of claim 1, wherein the finish portion, the inner portion, and the outer portion are free of the oxygen barrier layer.

7. The method of claim 1, wherein the top sealing surface, the inner portion, and the outer portion are free of the oxygen barrier layer.

8. The method of claim 1, wherein the base layer is polyethylene terephthalate.

9. The method of claim 1, wherein no part of the oxygen barrier layer extends through the outer portion or the inner portion.

10. The method of claim 1, wherein the oxygen barrier layer has a thickness that is less than a thickness of the inner portion and less than a thickness of the outer portion.

11. The method of claim 1, wherein the body portion and the bottom portion are below the support flange.

12. The method of claim 1, wherein the oxygen barrier layer is 8%-35% of the total weight of the preform when the container is configured to store food.

13. The method of claim 1, wherein the oxygen barrier layer is 20%-50% of the total weight of the preform when the container is configured to store wine or beer.

14. The method of claim 1, wherein the oxygen barrier layer has a thickness that is 20%-40% of a total thickness of the preform at the body portion.

15. The method of claim 1, wherein the oxygen barrier layer has a thickness that is 30% of a total thickness of the preform at the body portion.

* * * * *